(12) United States Patent
Sakai et al.

(10) Patent No.: US 6,643,525 B1
(45) Date of Patent: Nov. 4, 2003

(54) MOBILE COMMUNICATION SYSTEM

(75) Inventors: Kenichiro Sakai, Kawasaki (JP);
Yasuko Onodera, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/565,506

(22) Filed: May 5, 2000

(51) Int. Cl.⁷ ................................ H04M 1/00
(52) U.S. Cl. ............... 455/560; 455/561; 455/550.1; 455/445; 455/418; 379/269; 379/268; 370/437; 370/398; 709/238; 709/245; 709/250
(58) Field of Search ............... 455/560, 561, 455/550.1, 412.1, 418, 419, 424; 379/269, 268; 370/398, 437, 238; 709/245, 250

(56) References Cited

U.S. PATENT DOCUMENTS

| | | | | |
|---|---|---|---|---|
| 4,827,499 A | * | 5/1989 | Warty et al. | 455/560 |
| 5,226,071 A | * | 7/1993 | Bolliger et al. | 455/435 |
| 5,239,539 A | * | 8/1993 | Uchida et al. | 370/398 |
| 5,915,225 A | * | 6/1999 | Mills | 455/558 |
| 5,974,134 A | * | 10/1999 | Park | 379/242 |
| 6,529,959 B1 | * | 3/2003 | Armistead et al. | 709/238 |

FOREIGN PATENT DOCUMENTS

JP          9-214423        8/1997

* cited by examiner

Primary Examiner—William Trost
Assistant Examiner—Danh Lee
(74) Attorney, Agent, or Firm—Katten Muchin Zavin Rosenman

(57) ABSTRACT

Disclosed is a mobile communication system that includes a mobile switching center having a multiprocessor configuration and radio base stations subordinate to the mobile switching center, with a single radio base station being connected with mutually independent signaling links from a plurality of processors within the mobile switching center. When a call issued from that or other system is received by a subscriber under that system, call ID information contained in a mobile call demand signal sent from the mobile switching center to the radio base station has a storage area for an identifier of a processor within that mobile switching center. The radio base station allows the destination of return of a mobile call response signal to be the processor indicated by the processor identifier.

12 Claims, 13 Drawing Sheets

FIG. 3    CPR → SLC Translation table

| CPR1 → SLC= 0, 1 |
| CPR2 → SLC= 2, 3 |

SLC ↔ SLS group translation tables(MSC)

Four links

| SLC=0, SLS=0, 2, 4, 6, 8, 10, 12, 14 | ] CPR1 |
| SLC=1, SLS=1, 3, 5, 7, 9, 11, 13, 15 |
| SLS=2, SLS=0, 2, 4, 6, 8, 10, 12, 14 | ] CPR2 |
| SLS=3, SLS=1, 3, 5, 7, 9, 11, 13, 15 |

Seven links

| SLC=0, SLS=0, 7, 14 | ] CPR1 |
| SLC=1, SLS=1, 8, 15 |
| SLC=2, SLS=2, 9 |
| SLC=3, SLS=3, 10 | ] CPR2 |
| SLC=4, SLS=4, 11 |
| SLC=5, SLS=5, 12 | ] CPR3 |
| SLC=6, SLS=6, 13 |

SLC ↔ SLS group translation tables(BSC)

FIG. 7A
Four links

SLC=0, SLS=0, 4, 8, 12

SLC=1, SLS=1, 5, 9, 13

SLC=2, SLS=2, 6, 10, 14

SLC=3, SLS=3, 7, 11, 15

FIG. 7B
Seven links

SLC=0, SLS=0, 7, 14

SLC=1, SLS=1, 8, 15

SLC=2, SLS=2, 9

SLC=3, SLS=3, 10

SLC=4, SLS=4, 11

SLC=5, SLS=5, 12

SLC=6, SLS=6, 13

MOBILE COMMUNICATION SYSTEM

BACKGROUND OF THE INVENTION

1. Field of the Invention

The present invention relates to a mobile communication system that includes a mobile switching center having a multiprocessor configuration and at least one radio base station subordinate to the mobile switching center.

2. Description of the Related Art

Referring to FIG. 12, an exemplary configuration is shown of such a mobile communication system that includes a mobile switching center having a multiprocessor configuration and a plurality of radio base stations subordinate to the mobile switching center.

In the shown example, a system S1 comprises a mobile switching center MSC that includes a plurality of processors CPR1 to CPRn, and a plurality of radio base stations BSC1 to BSC5 subordinate to the processors.

The processors CPR1 to CPRn of FIG. 12 example are subjected to an integrated control by a main processor MPR. The radio base stations BSC1 and BSC2 are allocated to the processor CPR1, with the radio base stations BSC3 and BSC4 allocated to the processor CPR2. Location areas LAC1 to LAC3 are subordinate correspondingly to the radio base stations BSC1 to BSC5.

In FIG. 12, the processors CPR1 to CPRn are linked to another system S2.

In another configuration shown in FIG. 13, a single radio base station BSC connects with mutually independent signaling links from the respective processors CPR1, CPR2, etc.

One goal of the configurations of FIGS. 12 and 13 is to improve the reliability. The FIG. 13 configuration in particular may often be employed in cases where the radio base station BSC does not balance with the mobile switching center MSC in respect of subscriber capacities and throughputs.

In a relationship between the mobile switching center MSC and the radio base station BSC that have a system specification of FIG. 13 configuration, a small subscriber capacity of system configuration provides the ratio of 1:1 or 2:1 in the corresponding relation between the processors CPR of the mobile switching center MSC and the radio base station BSC as in exemplary configurations of FIGS. 14 and 15, whereas a large subscriber capacity of system configuration provides the ratio of multitude: multitude in the corresponding relation between the processors CPR and the radio base stations BSC as shown in FIG. 16.

In such a mobile communication system S1, consideration is given to the case where a call from a subscriber of the other system S2 or of that system S1 is received by a mobile subscriber MS under the system S1.

Although the termination call is controlled at that time, the processor CPR having a control program MCA for controlling that call is a processor that takes charge of call originating control in case of the call under its own system, but it is a processor that has received the call control information in case of an incoming connection call from the other system.

By means of a signaling connection control part (SCCP) that corresponds to the third layer in the function level of No. 7 signaling system, the processor CPR sends a mobile subscriber MS call demand signal PAGE to the radio base station BSC. Used herein is a connectionless signal from the SCCP.

The radio base station BSC then calls the mobile MS and returns a call response signal PAGE_RSP responding thereto to the mobile switching center MSC. Used herein is a connection oriented signal from the SCCP.

Such a prior art may allow the destination of return of the call response signal PAGE_RSP to result in the processor other than the processor CPR in which the termination call is controlled.

More specifically, in the exemplary configuration of FIG. 17 shown in a manner corresponding to FIGS. 15 and 16, when the processor CPR1 sends a call demand signal PAGE to the radio base station BSC1, a call response signal PAGE_RSP responding thereto may possibly be returned to the processor CPR2.

Referring to FIG. 17, the processor CPR in the layer configuration includes an incoming call control part ICA, a moving call control part MCA and a moving protocol control part MPC. The processor interface part F1 has the functions of the SCCP, signaling network level MPT and level 2 in the No. 7 signaling system.

The radio base station BSC has an interface part equivalent to the processor interface part F1 and has a base station call control part BCA and a radio call control part RCA.

In the event that the call response signal PAGE_RSP has been returned to the processor CPR2 different from the processor CPR1 that sent the call demand signal PAGE as described above, all the subsequent call control signals required have to be transferred between the processor CPR1 and the processor CPR2.

The reason is that the call response signal PAGE_RSP sent form the radio base station BSC1 is a connection request message (connection establishing demand) of the SCCP connection oriented signal and that to ensure the sequence of the subsequent sending data the same SLS (signaling link selection) value is used to provide a control such that sending is made to the same signaling link.

This often resulted in an increase in the amount of resources (the amount of memory block, processor activity ratio, etc.) for use in the interprocessor communication, as compared with the case where the call response signal PAGE_RSP has been returned to the same processor CPR.

In order to transfer data signals from the processor CPR2 to the processor CPR1, as shown in FIGS. 18A and 18B the call response signal PAGE_RSP (FIG. 18B) is arranged to include the CPR number within the call ID information TAG contained in the call demand signal PAGE (FIG. 18A).

Alternatively, use may be made of a mobile identifier IMSI contained in the call response signal PAGE_RSP to search the subscriber data base being managed in the main processor MPR. Otherwise, for the signals following the call response signal PAGE_RSP, a local reference number including the processor CPR number may be placed in a CC message returned from the mobile switching center MSC whereby the local reference number can automatically be inserted into the subsequent signals sent from the radio base station BSC.

The processor number can thus be readily identified for transfer. The transfer may be effected by way of the SCCP layer or the call control (application).

In any case, however, an increase will be inevitable in the amount of resources for use in the interprocessor communication.

SUMMARY OF THE INVENTION

It is therefore the object of the present invention to provide a signaling link selection method and apparatus in which the destination of return of a call response signal PAGE_RSP is arranged to result in a processor CPR having controlled termination calls thereby preventing any increase in the amount of resources (the amount of memory block, processor activity ratio, processor-to-processor adapter activity ratio) for use in the interprocessor communication.

According to a first aspect of the present invention, in order to achieve the above object, a mobile communication system includes a mobile switching center having a multiprocessor configuration and at least one radio base station subordinate to the mobile switching center, with a single radio base station being connected with signaling links independent of a plurality of processors within the mobile switching center.

Then, when a call issued from the or other system is received by a subscriber under the system, call ID information contained in a mobile call demand signal sent from the mobile switching center to the radio base station has a storage area for an identifier of a processor within the mobile switching center, and the radio base station allows the destination of return of a mobile call response signal to be the processor indicated by the processor identifier.

Preferably, in case no processor identifier is stored in the mobile switching center processor identifier storage area of the call ID information contained in the mobile call demand signal, the radio base station selects at random a signaling link to return the mobile call response signal.

It is more preferable that in case a called subscriber class has a priority, the processor identifier storage area store an ID number of a processor in which a termination call is under control at all times.

Preferably, in case a calling subscriber class has a priority, the processor identifier storage area stores an ID number of a processor in which a termination call is under control at all times.

According to a second aspect of the present invention there is provided a mobile communication system that includes a mobile switching center having a multiprocessor configuration and at least one radio base station subordinate to the mobile switching center, with a single radio base station being connected with signaling links independent of a plurality of processors within the mobile switching center, wherein when a call issued from the or other system is received by a subscriber under the system, call ID information contained in a mobile call demand signal sent from the mobile switching center to the radio base station has a storage area for a signaling link number between the mobile switching center and the radio base station, and wherein the radio base station allows the destination of return of a mobile call response signal to be the signaling link indicated by the signaling link number.

Preferably, in such a configuration, providing that no signaling link number between the mobile switching center and the radio base station is stored in the call ID information contained in the mobile call demand signal, the radio base station selects at random a signaling link to return the mobile call response signal.

It is more preferable that when the radio base station determines a link number to return the mobile call response signal from a processor ID number, a certain law be imparted so that a load between signaling links can be shared of a series of subsequent signals from the radio base station.

Furthermore, preferably, in case, with a signaling link independent of the processors within the mobile switching center being connected with a second radio base station different from a first radio base station, the mobile call demand signal is sent to the second radio base station in addition to the first radio base station when it is received by a subscriber under a first system, no processor identifier is stored in the processor identifier storage area of the call ID information contained in the mobile call demand signal sent to the second radio base station so that the second radio base station can select at random a signaling link to return the mobile call response signal.

Furthermore, preferably, in case, with a signaling link independent of the processors within the mobile switching center being connected with a second radio base station different from a first radio base station, the mobile call demand signal is sent to the second radio base station in addition to the first radio base station when it is received by a subscriber under a first system, no signaling link number is stored in the mobile switching center to radio base station link number storage area of the call ID information contained in the mobile call demand signal sent to the second radio base station so that the second radio base station can select at random a signaling link to return the mobile call response signal.

The above and other objects, aspects, features and advantages of the present invention will become more apparent from the following description when read in conjunction with the accompanying drawings.

BRIEF DESCRIPTION OF THE DRAWINGS

FIG. 3 shows a CPR→SLC translation table held in a mobile switching center MSC;

FIGS. 7A and 7B show translation tables for determining an SLS group from the SLC set in the call ID information TAG;

DESCRIPTION OF THE PREFERRED EMBODIMENTS

Figure 1:
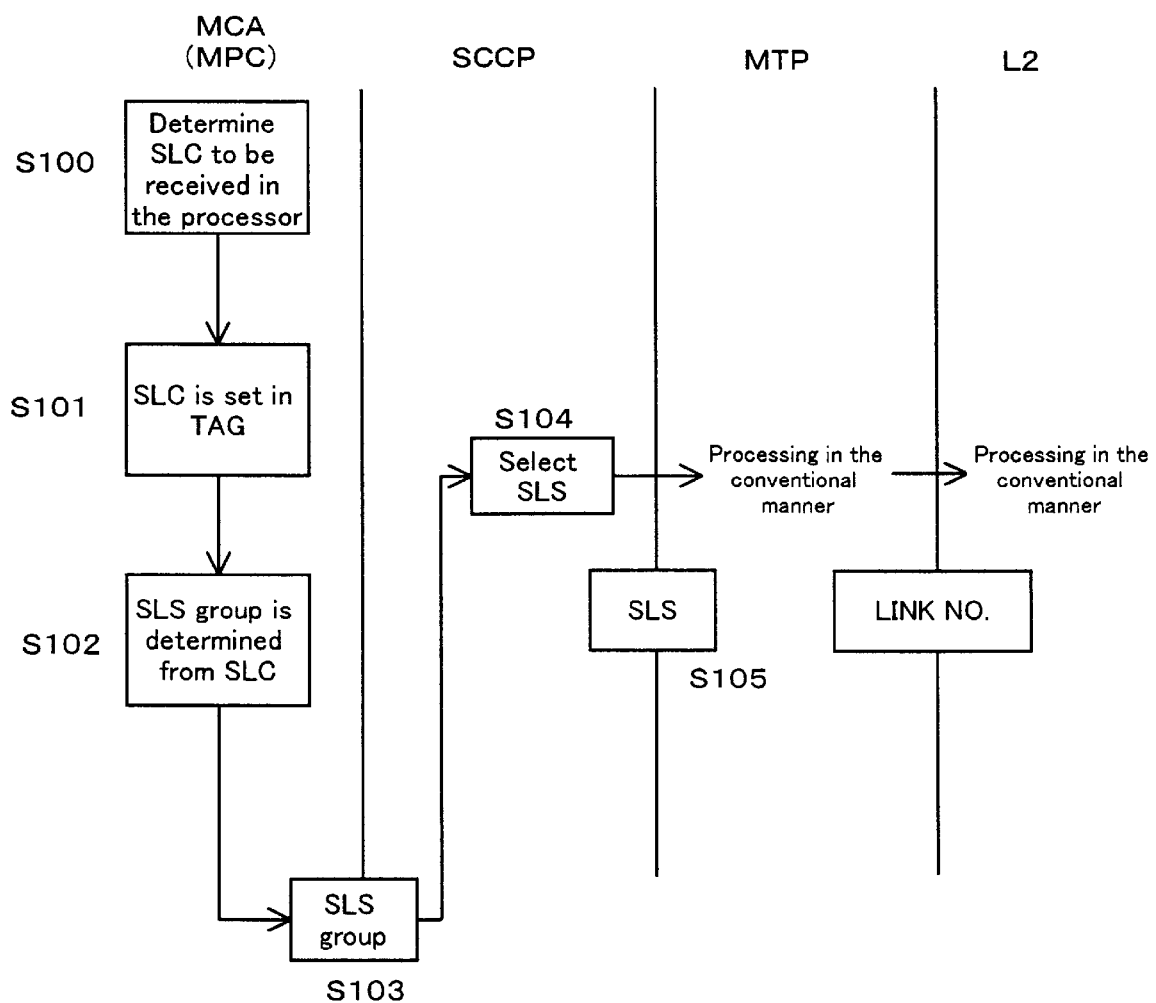
FIG. 1 is an explanatory diagram of the processing functions of a processor CPR in accordance with an embodiment of the present invention.

The present invention will now be described with reference to the accompanying drawings which illustrate preferred embodiments thereof in a non-limitative manner. Throughout several views, the same or like parts are designated by the same or corresponding reference numerals or reference symbols.

Figure 17:
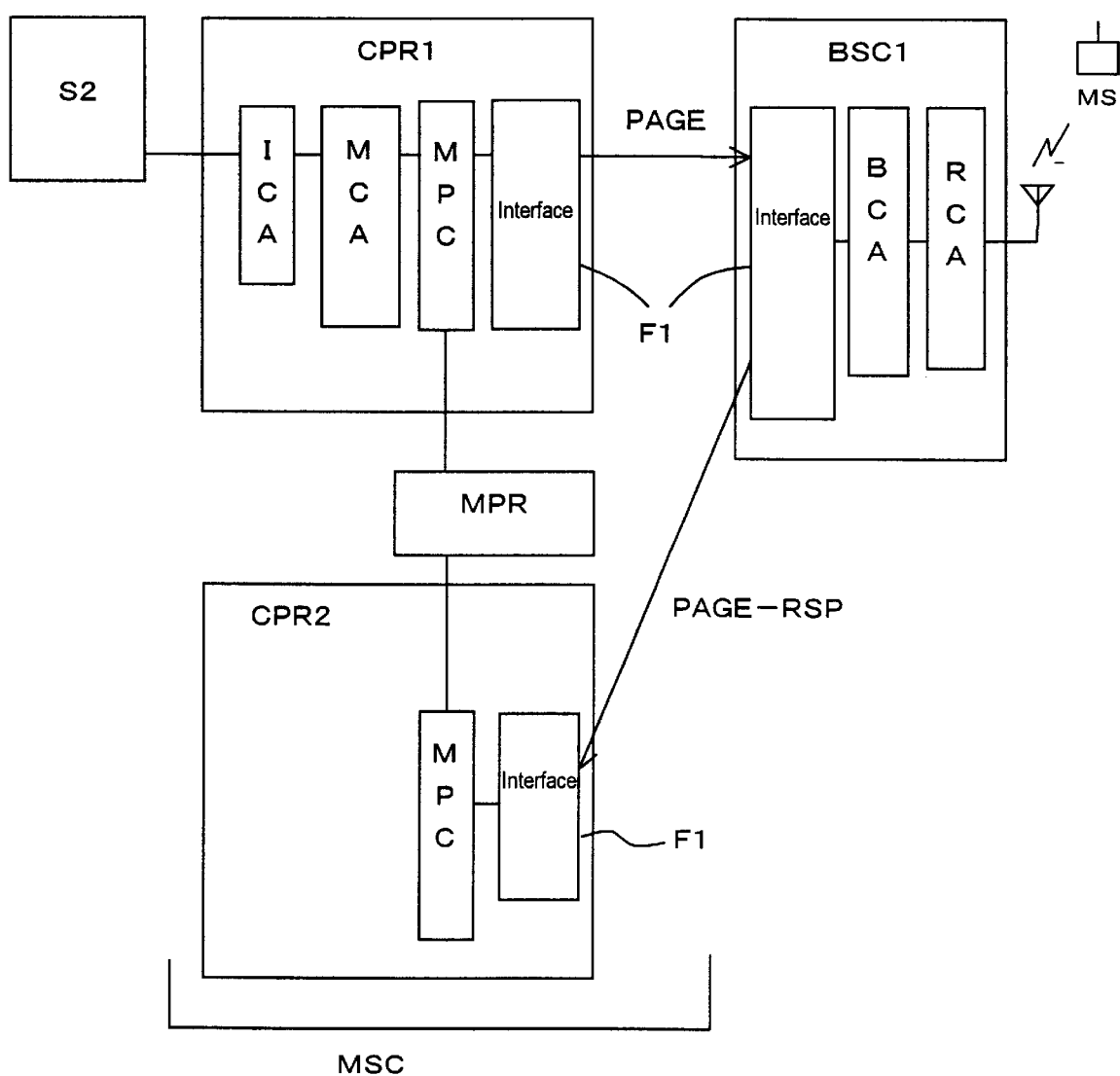
FIG. 17 shows an exemplary system configuration corresponding to FIGS. 15 and 16, for explaining the case where when a processor CPR1 sends a call demand signal PAGE to a radio base station BSC1, a call response signal PAGE_RSP for responding to this is returned to another processor CPR2.
Figure 18A:
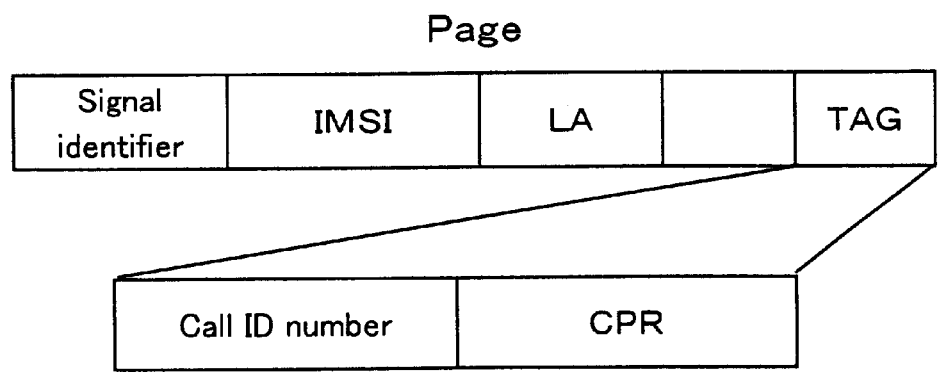
FIGS. 18A and 18B are explanatory diagrams of a method for transferring data signals from the processor CPR2 to the processor CPR1.
Figure 18B:
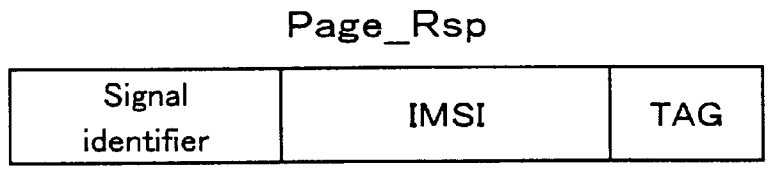

Referring to FIG. 1, one embodiment of the present invention is shown by way of example to explain processing functions of a processor CPR in accordance with the present invention. For the configurations of the mobile switching center MSC and radio base station BSC to implement such functions, reference is made to FIG. 17 that has been described earlier.

Figure 2:
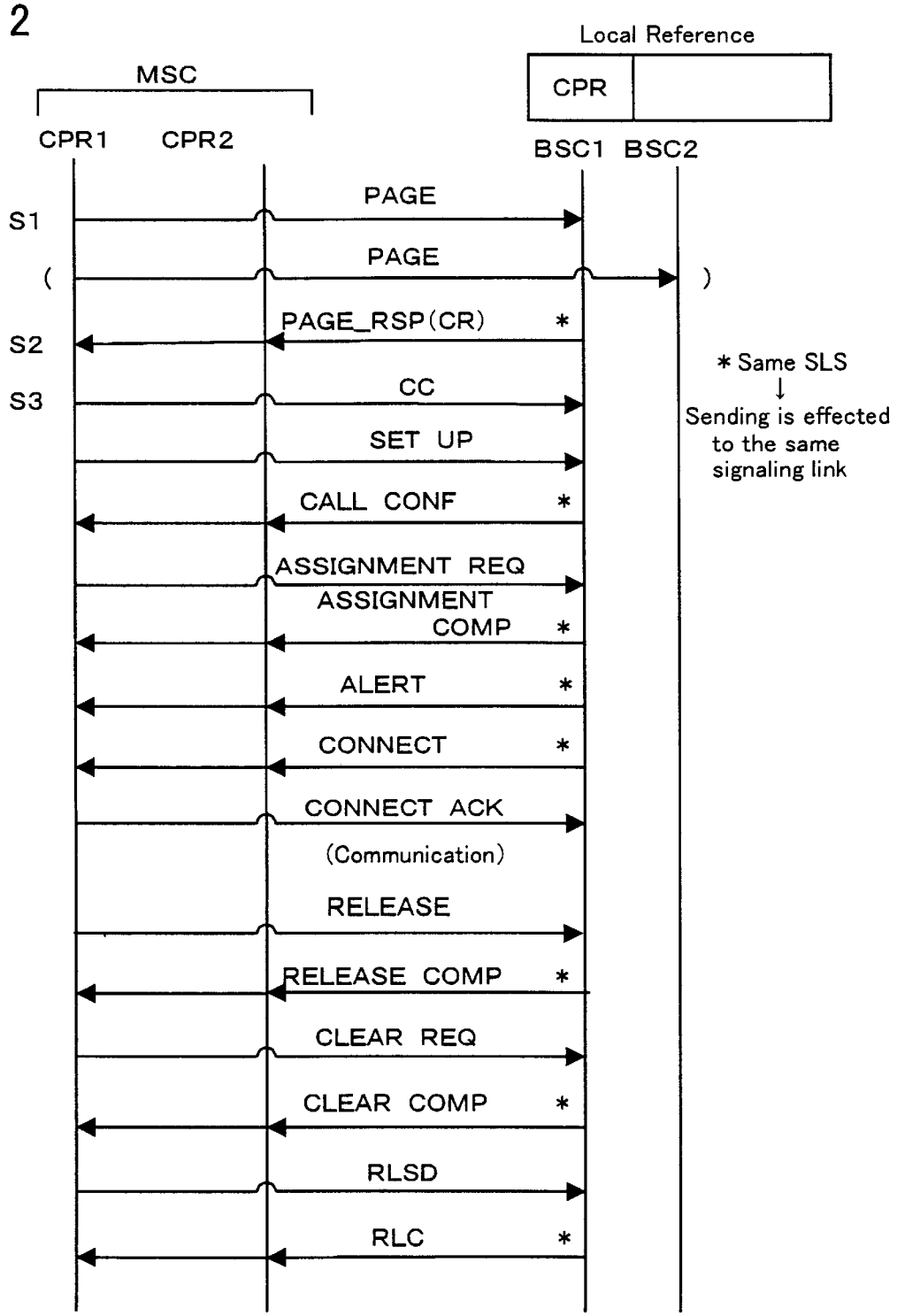
FIG. 2 is a flowchart of actions in accordance with the present invention.

FIG. 2 shows a flow of operations in accordance with the present invention. Description is made of FIG. 1 in conjunction with FIG. 2.

When the mobile switching center MSC sends a mobile call demand signal PAGE to the radio base station BSC (step S1 of FIG. 2), a call control part MCA included in a processor CPR1 of the mobile switching center MSC determines a link number SLC to be received in that processor (step S100). The link number is determined by referring to a CPR→SLC translation table shown in FIG. 3, held in the mobile switching center MSC.

As seen in the translation table of FIG. 3, corresponding link numbers SLC are 0 and 1 for the processor CPR1, with 2 and 3 for a processor CPR2.

Figures 4, 5A, 5B:
FIG. 4 shows an acquired link number, set in a call ID information TAG.
FIGS. 5A and 5B show SLC-SLS group translation tables for determining a signaling link selection (SLS) group from the link number SLC.

The thus determined link number SLC is set in call ID information TAG as illustrated in FIG. 4 (step S101).

If a certain law, such as round robin scheduling for example, is herein imparted to a logic under which the link number SLC is selected by the call control part MCA within the mobile switching center MSC, it is possible to achieve a signaling link load sharing in the sending of the mobile call demand signal PAGE.

As a result, the radio base station BSC is capable of effecting the load sharing between all the subsequent signaling links due to the reason that will be described later.

A signaling link selection (SLS) group is then determined from the link number SLC (step S102). A request for sending is then issued to the SCCP that is a function of the interface part F1 included in the processor CPR configuration shown in FIG. 17 (step S103).

SLC-SLS group translation tables shown in FIGS. 5A and 5B are used to determine the signaling link selection (SLS) group from the link number SLC.

FIG. 5A illustrates the case of four links and FIG. 5B illustrates the case of seven links.

The SCCP selects a single SLS from the SLS group received from the call control part MCA (step S104). The subsequent processings of the signaling network level MTP and the level L2 are performed in the conventional manner.

Such selection of a single SLS prevents sending to signaling links other than the target signaling link.

In case of the ordinary SCCP control that is not based on the present invention, values 0 to 15 are used for the SLS in the round robin scheduling, due to the load sharing between the signaling links. This may possibly bring about sending to the signaling links other than the target signaling link in spite of use of the same processor. The present invention can avoid this.

A request to send to the radio base station BSC is issued for the subsequent signaling network levels MTP (step S105). The subsequent MTP processings and level L2 processings are carried out in the conventional manner.

Figure 6:
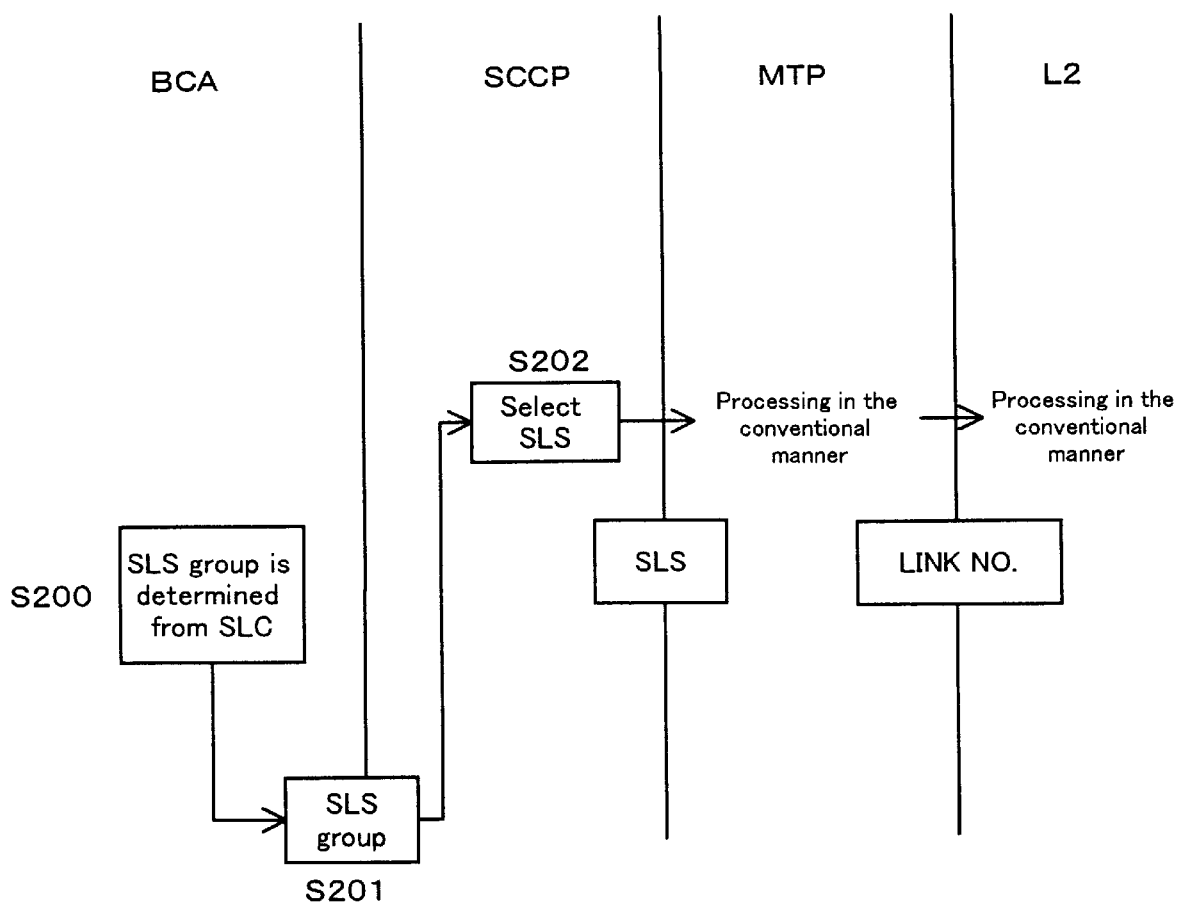
FIG. 6 is a flowchart obtained when, upon reception of a mobile call demand signal PAGE, a radio base station BSC issues a call of a mobile MS to subordinate radio stations.

On the other hand, upon the reception of the mobile call demand signal PAGE, the radio base station BSC issues a call for a mobile MS to subordinate radio stations. In the presence of a response from the mobile MS to this, as illustrated in FIG. 6 the SLS group is determined from the SLC set in the call ID information TAG using translation tables illustrated in FIGS. 7A and 7B (step S200). FIG. 7A shows the case of four links and FIG. 7B shows the case of seven links.

A request to send a mobile call response signal PAGE_RSP is then issued to the SCCP of the interface part F1 included in the radio base station BSC (step S201).

The SCCP in the radio base station BSC selects a single SLS from the SLS group received from a call control part BCA included in the radio base station BSC (step S202). This prevents the mobile call response signal PAGE_RSP from being sent to the link numbers SLC other than the link number SLC specified by the mobile switching center MSC (see step S3 of FIG. 2).

From the steps shown in FIG. 2 onward, sending is effected to the same signaling link, and the mobile call response signal PAGE_RSP is sent to the processor that has issued the mobile call demand signal PAGE.

Direct sending is thus achieved from the radio base station BSC1 to the processor CPR1 without passing through another radio base station BSC2 in FIG. 2.

The mobile call response signal PAGE_RSP sent by the SCCP at that time serves also as a CR (Connection Request) message (a connection establishing message of the SCCP), and the SLS selected herein is used for all of a series of messages sent from the radio base station BSC to the mobile switching center MSC after the establishment of connection till the release of connection. For this reason, the subsequent signaling messages are prevented from being sent to different link numbers SLC.

Afterwards, the mobile switching center MSC sends an SCCP CC message to the radio base station BSC. In such a case, values 0 to 15 are used for the SLS in the round robin scheduling, due to the load sharing between the signaling links within the processor CPR when a request for sending of the message is issued from the call control part MCA in the mobile switching center MSC to the SCCP. Such a respect falls under a known technique.

The SLS selected herein is used for all of a series of messages sent from the mobile switching center MSC to the radio base station BSC until the release of the connection. For this reason, the subsequent signaling messages are prevented from being sent to different link numbers SLC.

The method has been described hereinabove of sending SLS group from call control of the mobile switching center MSC or of the radio base station BSC to the SCCP. This is due to the fact that it is common to deliver the SLS from the SCCP to the MTP in the typical protocols.

Figure 8:
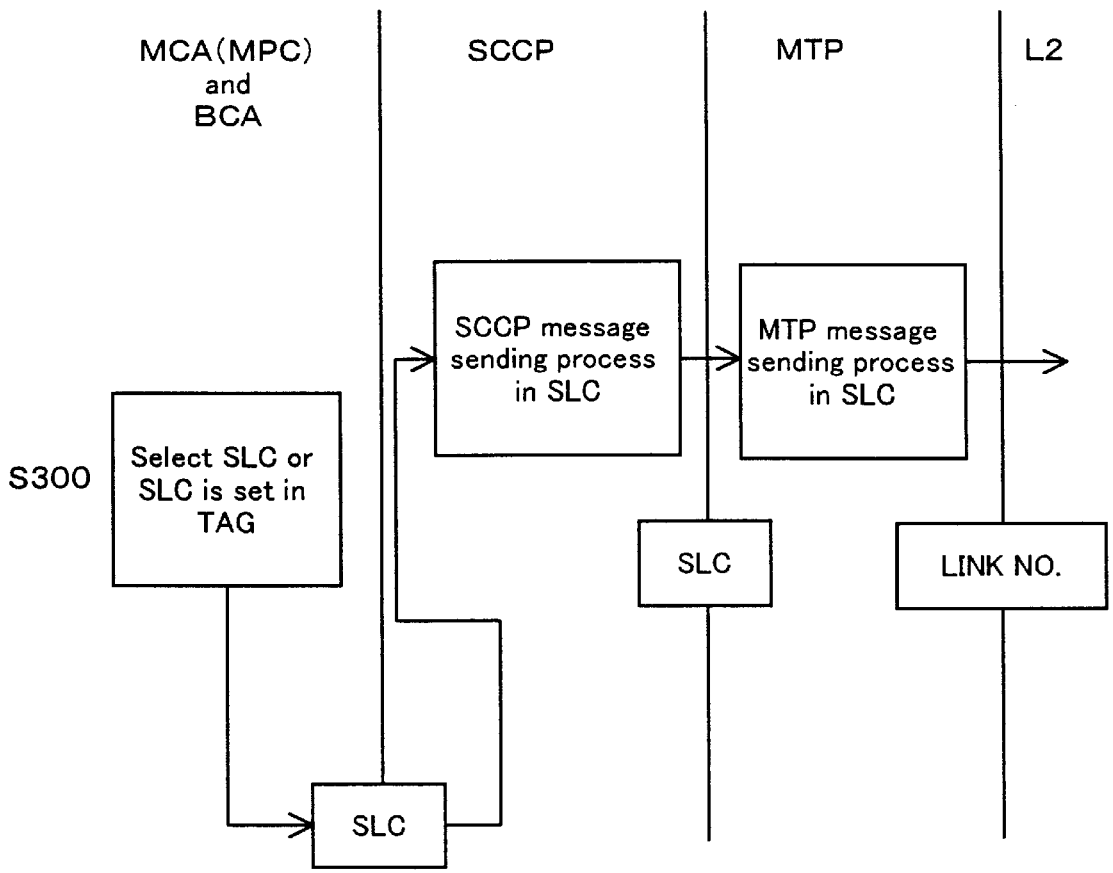
FIG. 8 shows a method for directly delivering the SLC value from the mobile switching center MSC or mobile switching center MSC call control part via a signaling connection control part SCCP to a signaling network level MTP.

As illustrated in FIG. 8 there is also a method of directly delivering the link number SLC from the MSC or MSC call control via the SCCP to the MTP.

Figure 9:
FIG. 9 is an explanatory diagram of a method for setting the processor CPR number into the call ID information TAG.

Although the link number SLC has been set in the call ID information TAG in the methods described above, the processor (CPR) number could instead be set in the call ID information TAG as shown in FIG. 9.

Figure 10:
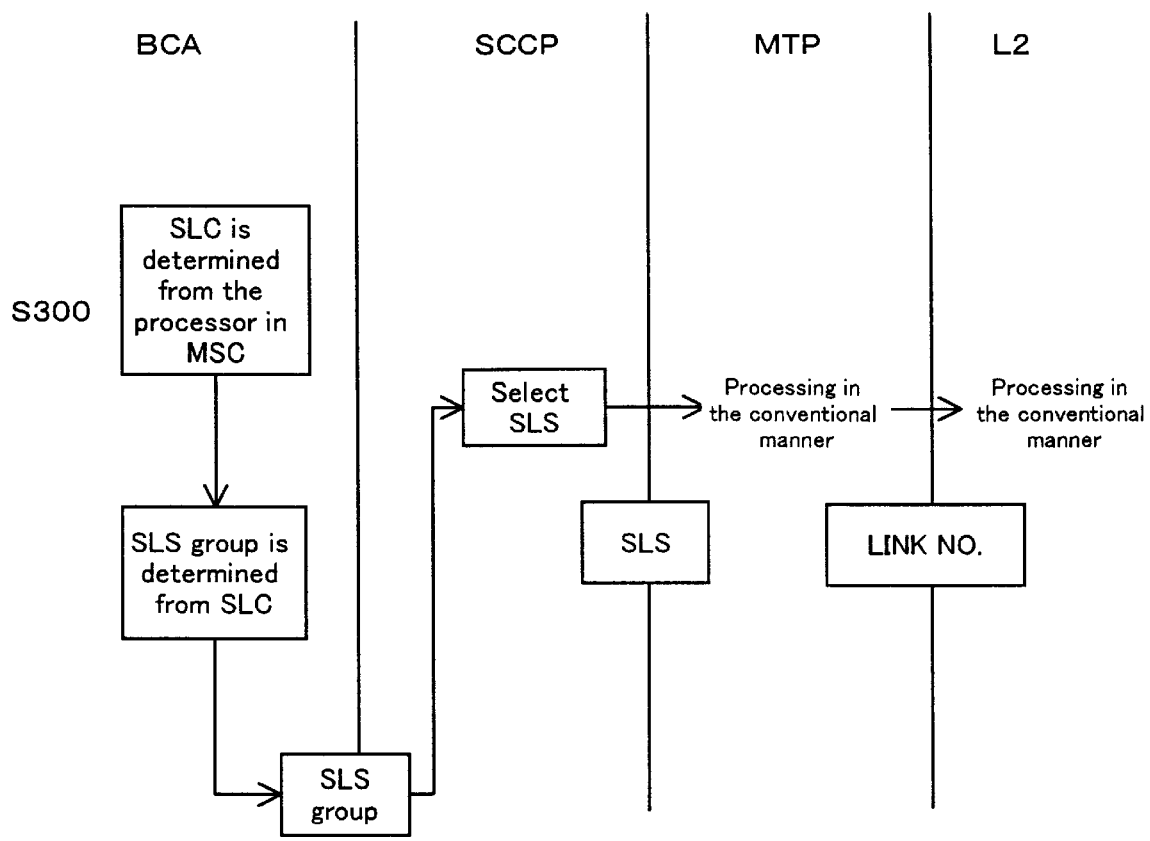
FIG. 10 is a flowchart obtained when the link number SLC is determined from the processor CPR number to achieve load sharing between signaling links in a call control part BCA within the radio base station BSC.

In such an event, as shown in FIG. 10 the load sharing between signaling links can be implemented by conferring a certain low such as the round robin scheduling for example when the link number SLC is determined from the processor (CPR) number in the call control part BCA within the radio base station BSC (step S300).

Figure 11:
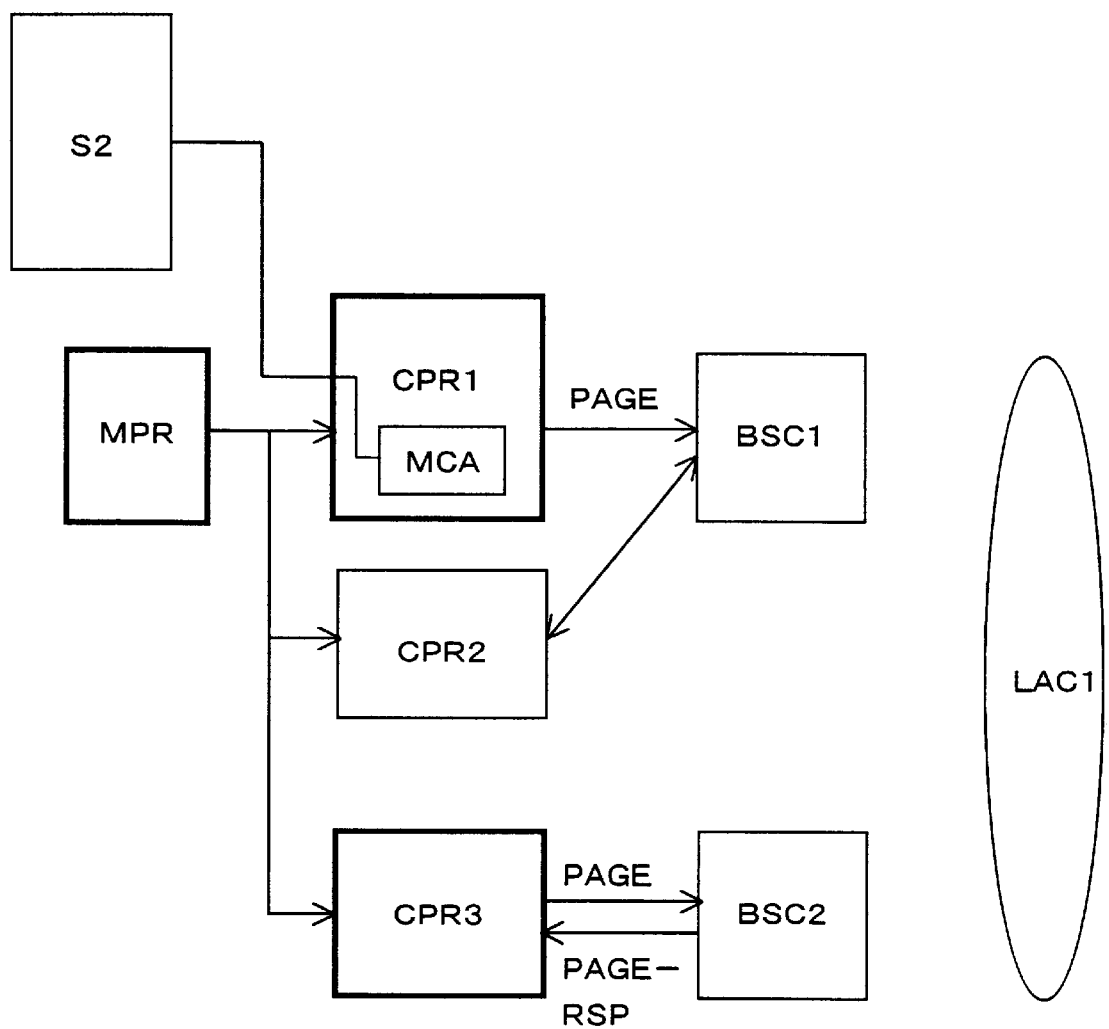
FIG. 11 shows the configuration of another embodiment in which a location area LAC1 includes radio base stations BSC1 and BSC2.
Figure 12:
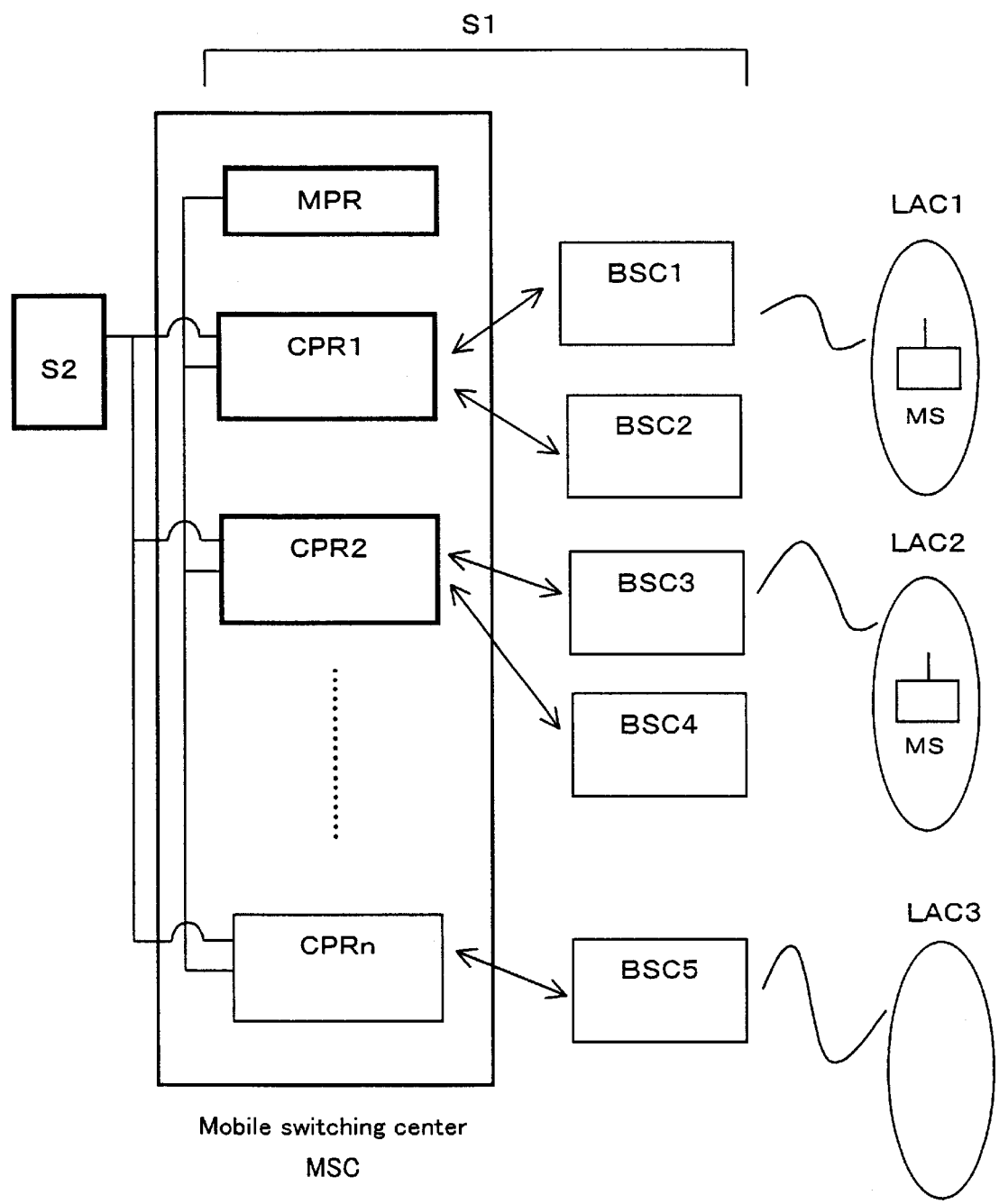
FIG. 12 shows an exemplary configuration of a mobile communication system employing a multiprocessor based configuration, the system including a single mobile switching center MSC and its subordinate radio base stations BSC.
Figure 13:
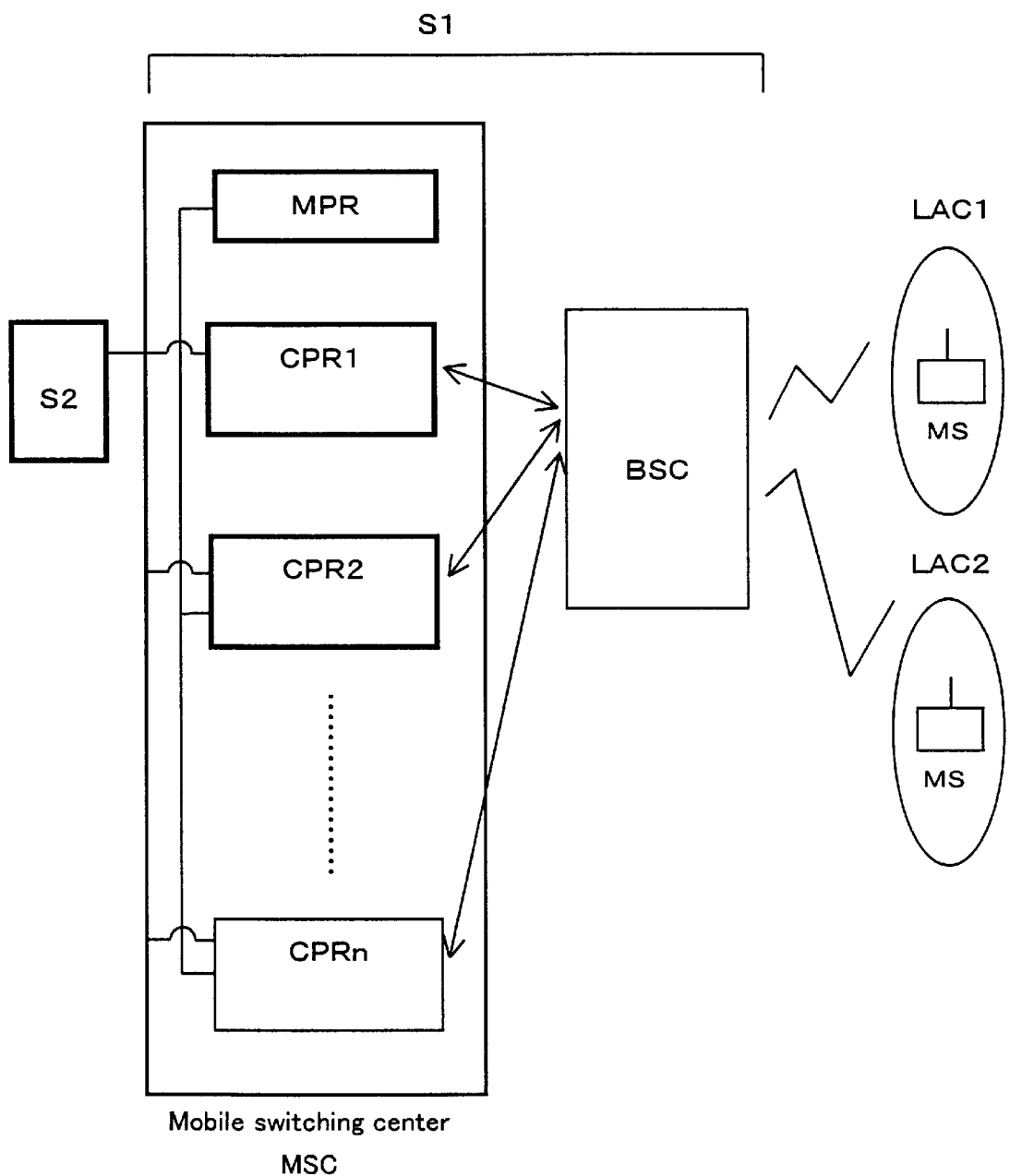
FIG. 13 shows an example in which a single radio base station BSC is associated with mutually independent signal links from processors CPR1, CPR2, etc., within the mobile switching center MSC.
Figure 14:
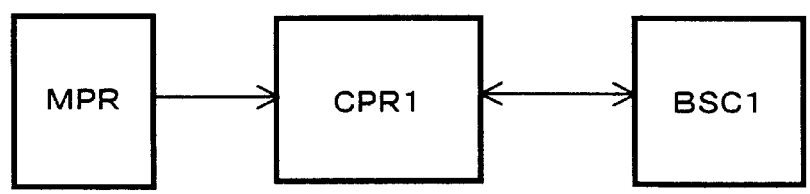
FIG. 14 shows an exemplary system configuration having a small subscriber capacity in which the ratio of 1:1 is established in the relation between the mobile switching center MSC and the radio base station BSC that have a system specification of FIG. 13 configuration.
Figure 15:
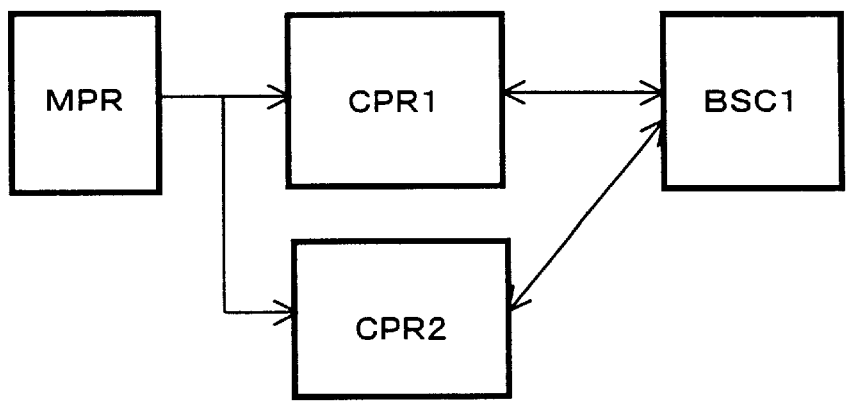
FIG. 15 shows an exemplary system configuration having a small subscriber capacity in which the ratio of 2:2 is established in the relation between the mobile switching center MSC and the radio base station BSC that have a system specification of FIG. 13 configuration.
Figure 16:
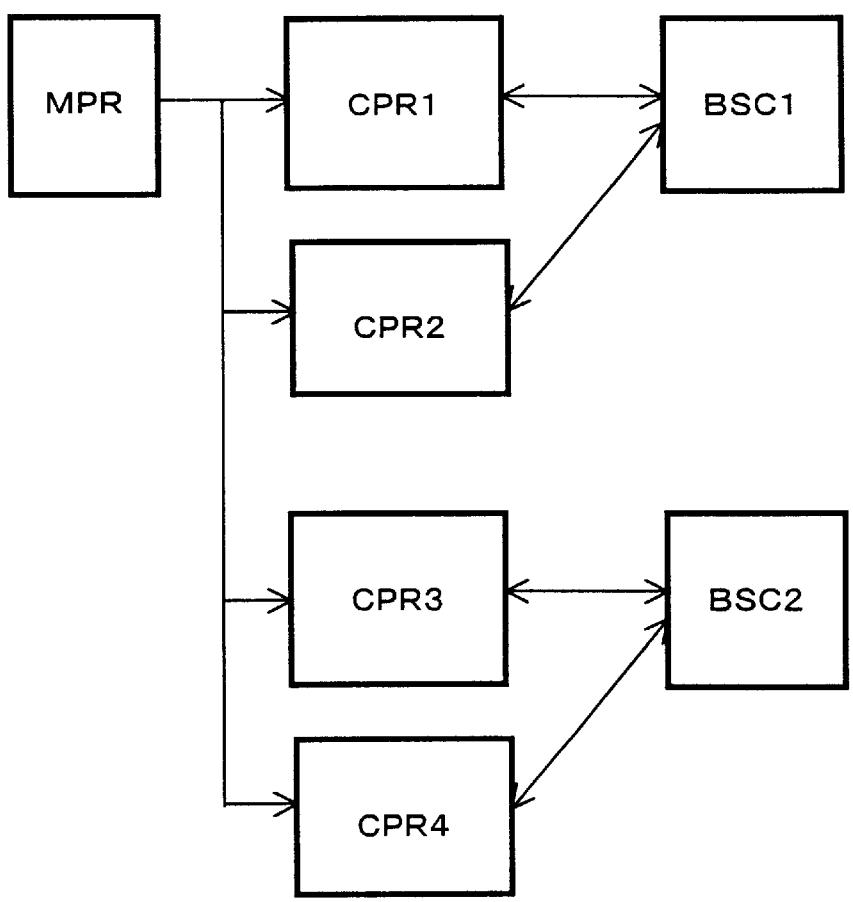
FIG. 16 shows an exemplary system configuration having a large subscriber capacity in which the ratio of multitude multitude is established in the corresponding relation between the mobile switching center MSC and the radio base station BSC.

Although the above description has been made on condition that a single radio base station BSC is present, consideration is given to a configuration of FIG. 11 as another embodiment. In this configuration, a location area LAC1 includes radio base stations BSC1 and BSC2 by way of example. A mobile call signal PAGE needs to be sent to both the radio base stations BSC1 and BSC2.

It is to be noted that such plural signal sendings may occur also when the mobile switching center has no recognition of information on location area where the mobile lies.

In case a processor CPR3 including no call control receives a mobile call response signal PAGE_RSP, it is inevitable to perform a signal transfer between the following processor CPR1 and processor CPR3.

The reason is that in the call control effected within the radio base station BSC2 any meanings are not imparted to both the process for determining the SLS group from the link number SLC set in the call ID information TAG and to the process for selecting a single SLS from the SLS group by the SCCP within the radio base station BSC.

As measures to obviate such meaninglessness, the radio base station BSC may effect the conventional procedures on condition that the TAG does not include CPR/SLC whereby the meaningless processing steps are not carried out by the radio base station BSC.

As is apparent from the above description of the embodiments, the present invention enables the destination of return of the call response signal PAGE_RSP to be the processor CPR having controlled termination calls.

It is therefore possible to prevent any additional increase in the amount of resources (the amount of memory block, processor activity ratio, processor-to-processor adapter activity ratio) for use in the interprocessor communication, thus contributing to an improved reliability of the mobile switching centers.

What is claimed is:

1. A mobile communication system comprising:

a mobile switching center with a multiprocessor configuration having a plurality of processors;

at least one radio base station subordinate to the mobile switching center; and signaling links to be connected to the radio base station, which are independent from the plurality of processors within the mobile switching center, wherein when a subscriber accommodated within one system receives a call issued from a subscriber of the same system or another system, a call ID information contained in a mobile call request signal, which is sent from the mobile switching center to the radio base station, includes a processor identifier area for storing a processor identifier to indicate a processor within the mobile switching center, and wherein the radio base station returns a mobile call response signal to the processor indicated by the processor identifier.

2. The mobile communication system according to claim 1, wherein in case no processor identifier is stored in the processor identifier area, the radio base station selects at random a signaling link to return the mobile call response signal.

3. The mobile communication system according to claim 2, wherein in case, with a signaling link independent of said processors within said mobile switching center being connected with a second radio base station different from a first radio base station, said mobile call demand signal is sent to said second radio base station in addition to said first radio base station when it is received by a subscriber under a first system, no processor identifier is stored in said processor identifier storage area of said call ID information contained in said mobile call demand signal sent to said second radio base station so that said second radio base station can select at random a signaling link to return said mobile call response signal.

4. The mobile communication system according to claim 1, wherein in case a called subscriber class has a priority, the processor identifier area stores an ID number of a processor in which an incoming call is under control at all times.

5. The mobile communication system according to claim 1, wherein in case a calling subscriber class has a priority, the processor identifier area stores an ID number of a processor in which an incoming call is under control at all times.

6. The mobile communication system according to claim 1, wherein when said radio base station determines a link number to return the mobile call response signal from a processor ID number, a certain law is imparted so that a load between signaling links can be shared of a series of subsequent signals from said radio base station.

7. A mobile communication system comprising:

a mobile switching center with a multiprocessor configuration having a plurality of processors;

at least one radio base station subordinate to the mobile switching center; and signaling links to be connected to the radio base station, which are independent from the plurality of processors within the mobile switching center, wherein when a subscriber accommodated within one system receives a call issued from a subscriber of the same system or another system, a call ID information contained in a mobile call request signal, which is sent from the mobile switching center to said radio base station, includes a link number area for storing a signaling link number between the mobile switching center and the radio base station, and wherein the radio base station returns a mobile call response signal to the signaling link indicated by the signaling link number.

8. The mobile communication system according to claim 7, wherein in case no signaling link number between the mobile switching center and the radio base station is stored in the call ID information contained in said mobile call demand signal, said radio base station selects at random a signaling link to return the mobile call response signal.

9. The mobile communication system according to claim 7, wherein in case a called subscriber class has a priority, the processor identifier storage area stores an ID number of a processor in which an incoming call is under control at all times.

10. The mobile communication system according to claim 7, wherein in case a calling subscriber class has a priority, the processor identifier storage area stores an ID number of a processor in which an incoming call is under control at all times.

11. The mobile communication system according to claim 7, wherein when the mobile switching center determines a signaling link number to send said mobile call request signal, a certain law is imparted so that a load between signaling links can be shared of a series of subsequent signals from said radio base station.

12. The mobile communication system according to claim 7, wherein in case, with a signaling link independent of said processors within said mobile switching center being connected with a second radio base station different from a first radio base station, said mobile call demand signal is sent to said second radio base station in addition to said first radio base station when it is received by a subscriber under a first system, no signaling link number is stored in said mobile switching center to radio base station link number storage area of said call ID information contained in said mobile call demand signal sent to said second radio base station so that said second radio base station can select at random a signaling link to return said mobile call response signal.

* * * * *

UNITED STATES PATENT AND TRADEMARK OFFICE
CERTIFICATE OF CORRECTION

PATENT NO. : 6,643,525 B1
DATED : November 4, 2003
INVENTOR(S) : K. Sakai et al.

It is certified that error appears in the above-identified patent and that said Letters Patent is hereby corrected as shown below:

<u>Title page,</u>
Please add item:
-- [30] Foreign Application Priority Data
August 25, 1999 (JP) 11-238162 --

Signed and Sealed this

Second Day of March, 2004

JON W. DUDAS
*Acting Director of the United States Patent and Trademark Office*